(12) United States Patent
Jeong et al.

(10) Patent No.: US 9,714,782 B2
(45) Date of Patent: Jul. 25, 2017

(54) DEVICE AND METHOD FOR CONTROLLING COMPRESSOR, AND REFRIGERATOR INCLUDING SAME

(75) Inventors: Sangsub Jeong, Seoul (KR); Hyuk Lee, Seoul (KR); Wonsik Oh, Seoul (KR); Jongkwon Kim, Seoul (KR); Boram Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 13/808,352

(22) PCT Filed: Jul. 5, 2011

(86) PCT No.: PCT/KR2011/004916
§ 371 (c)(1),
(2), (4) Date: Jan. 4, 2013

(87) PCT Pub. No.: WO2012/005497
PCT Pub. Date: Jan. 12, 2012

(65) Prior Publication Data
US 2013/0098089 A1 Apr. 25, 2013

(30) Foreign Application Priority Data
Jul. 6, 2010 (KR) ........................ 10-2010-0065077

(51) Int. Cl.
*F25B 1/00* (2006.01)
*F25B 49/00* (2006.01)
(Continued)

(52) U.S. Cl.
CPC ............ *F25B 49/022* (2013.01); *F04B 35/04* (2013.01); *F04B 49/06* (2013.01); *F04D 27/001* (2013.01);
(Continued)

(58) Field of Classification Search
CPC . F25B 49/002; F25B 49/025; F25B 2600/021
(Continued)

(56) References Cited

U.S. PATENT DOCUMENTS 3,753,069 A * 8/1973 Newton ........................ 318/440
4,128,854 A * 12/1978 Ruminsky ............ H02H 7/0816
318/484
(Continued)

FOREIGN PATENT DOCUMENTS

CN 1390381 A 1/2003
CN 1502814 A 6/2004
(Continued)

OTHER PUBLICATIONS

Toshiaki, Running System of Submergible Pump, May 26, 1983, JPS5888482A, Whole Document.*
(Continued)

*Primary Examiner* — Justin Jonaitis
*Assistant Examiner* — Larry Furdge
(74) *Attorney, Agent, or Firm* — KED & Associates, LLP

(57) ABSTRACT

A compressor control device, a method for controlling a compressor, and a refrigerator including the same are provided. The compressor control device controls the compressor to be driven using a mode in which the compressor is selectively driven by an inverter and a mode in which the compressor is driven directly using a supply voltage, according to a quality of the supply voltage, a loss which is caused by use of the inverter reduced or removed by directly providing the supply voltage to the compressor within a predetermined voltage or frequency range, and an increased energy efficiency by reducing power consumption.

15 Claims, 5 Drawing Sheets

(51) Int. Cl.
  *F25B 49/02* (2006.01)
  *F04B 35/04* (2006.01)
  *F04B 49/06* (2006.01)
  *F04D 27/00* (2006.01)
  *F25D 29/00* (2006.01)

(52) U.S. Cl.
  CPC .... *F25B 49/025* (2013.01); *F04B 2203/0202* (2013.01); *F04B 2203/0204* (2013.01); *F04C 2240/403* (2013.01); *F04C 2240/808* (2013.01); *F04C 2270/86* (2013.01); *F25B 2600/021* (2013.01); *F25D 29/00* (2013.01); *Y02B 30/741* (2013.01)

(58) Field of Classification Search
  USPC .......................................................... 62/230
  See application file for complete search history.

(56) References Cited

U.S. PATENT DOCUMENTS

| | | | | |
|---|---|---|---|---|
| 4,566,289 | A | * | 1/1986 | Iizuka et al. ................. 62/228.4 |
| 2004/0040323 | A1 | | 3/2004 | Yokozeki et al. ........... 62/228.3 |
| 2004/0159115 | A1 | * | 8/2004 | Matsunaga et al. ......... 62/228.1 |
| 2006/0153688 | A1 | * | 7/2006 | Lee et al. ..................... 417/44.1 |
| 2009/0113908 | A1 | * | 5/2009 | Hwang et al. ............... 62/228.1 |

FOREIGN PATENT DOCUMENTS

| | | |
|---|---|---|
| CN | 1704590 A | 12/2005 |
| CN | 1848585 A | 10/2006 |
| JP | S5888482 A * | 5/1983 |
| JP | 2006-189021 | 7/2006 |
| KR | 10-2004-0023546 | 3/2004 |
| KR | 10-2005-0115482 | 12/2005 |
| KR | 10-2006-0081439 | 7/2006 |
| WO | WO 2010/116840 A1 | 10/2010 |

OTHER PUBLICATIONS

Chinese Office Action dated Jul. 1, 2014 issued in Application No. 201180036885.5.

International Search Report issued in PCT Application No. PCT/KR2011/004916 dated Feb. 29, 2012.

* cited by examiner

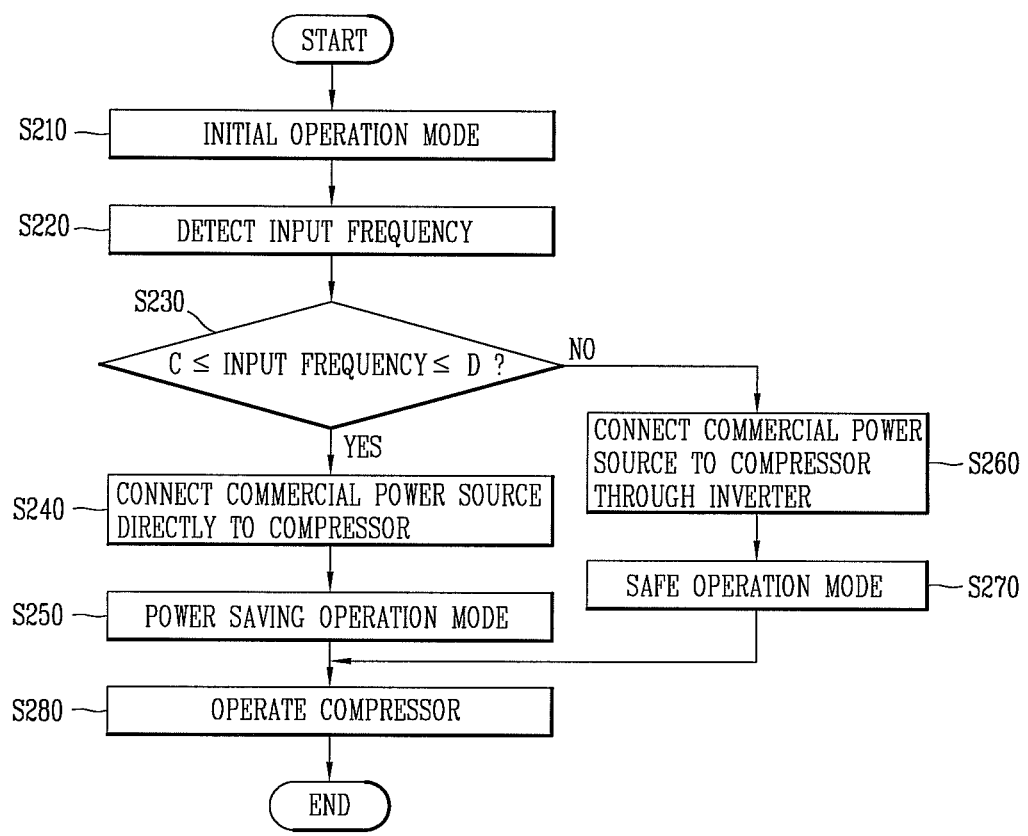

DEVICE AND METHOD FOR CONTROLLING COMPRESSOR, AND REFRIGERATOR INCLUDING SAME

CROSS-REFERENCE TO RELATED PATENT APPLICATIONS

This application is a U.S. National Stage Application under 35 U.S.C. §371 of PCT Application No. PCT/KR2011/004916, filed Jul. 5, 2011, which claims priority to Korean Patent Application No. 10-2010-0065077, filed Jul. 6, 2010.

TECHNICAL FIELD

The present disclosure relates to a compressor control device and method, and a refrigerator having the same. Particularly, the present disclosure relates to a compressor control device and method, and a refrigerator having the same, which operates a compressor by connecting a compressor directly to a commercial power source according to the quality of power of the commercial power source.

BACKGROUND ART

In general, a refrigerator is a device for freshly keeping storage items such as food and beverage, in fresh storage for a long period of time, and refrigerating or freezing storage items according to their types desired to be kept in storage.

The refrigerator operates according to driving of a compressor provided therein. Cooling air provided to the inside of the refrigerator is generated according to a heat exchange operation of a refrigerant and continuously provided to the inside of the refrigerator according to a repeated cycling operation of compression-condensation-expansion-evaporation. The refrigerant provided to the inside of the refrigerator is evenly transferred to the inside of the refrigerator by a convection current so that the food items within the refrigerator can be kept at a desired temperature.

Meanwhile, a refrigerator, air conditioner, etc. is provided with a compressor, and generally uses a brushless direct current (BLDC) compressor or reciprocating compressor.

The reciprocating compressor is a compressor that sucks, compresses and exhausts refrigerant gas through linear reciprocating motions of a piston provided inside a cylinder. The reciprocating compressor can be divided into a recipro type and a linear type according to the method of driving a piston.

The recipro type is such a type that changes rotary motions of a rotary motor into linear reciprocating motions by coupling a crankshaft to the motor and coupling a piston to the crankshaft. On the other hand, the linear type is such a type that reciprocates a piston through linear motions of a linear motor by connecting the piston directly to a rotor of the motor. Since the linear type reciprocating compressor has no crankshaft for converting rotary motions into rectilinear motions, frictional loss is small. Further, the linear type reciprocating compressor has compression efficiency higher than that of a general compressor.

A refrigerator having a compressor generally includes a compressor controller for controlling operations of the compressor and a refrigerator controller for controlling operations of the refrigerator. In this case, the compressor controller detects current and voltage flowing in the compressor and controls a stroke, speed, etc., using the detected current and voltage. The refrigerator controller controls the power of the compressor by outputting a control signal for turning on or off the compressor controller according to a refrigerator load, e.g., a temperature in the refrigerator, and accordingly, the refrigerator is driven.

In a refrigerator having a linear compressor or BLDC reciprocating compressor, the compressor receives commercial power, and is driven through a driver having a power device such as an inverter. The compressor performs operations of on/off, cooling capacity variation, speed control, frequency control, stroke control, etc. according to a command requested by the refrigerator. Accordingly, the refrigerator maintains the temperature in the refrigerator to an appropriate level through the operation of the compressor.

However, in a compressor control device and method, and a refrigerator having the same according to a conventional art, a compressor is always operated through a power conversion device having an inverter, and therefore, loss caused by the driving of the compressor occurs.

DISCLOSURE OF THE INVENTION

Therefore, an aspect of the detailed description is to provide a compressor control device and method, and a refrigerator having the same which operates a compressor through an inverter or inputs power of a commercial power source directly to the compressor according to the quality the power of the commercial power source, i.e., a wall power source.

Another aspect of the detailed description is to provide a compressor control device and method, and a refrigerator having the same which applies power of a commercial power source directly to a compressor when the input voltage or input frequency of the commercial power source is within a predetermined voltage range or predetermined frequency range, thereby reducing or removing loss caused by a compressor drive such as an inverter.

To achieve these and other advantages and in accordance with the purpose of the present invention, as embodied and broadly described herein, there is provided To achieve these and other advantages and in accordance with the purpose of this specification, as embodied and broadly described herein, a compressor control device includes a compressor having a motor; a commercial power source supplying power to the compressor; a power conversion unit converting the power of the commercial power source into driving power of the motor and outputting the converted driving power; and a compressor control unit operating the compressor by connecting the commercial power source directly to the compressor or operating the compressor through the power conversion unit, based on an input voltage or input frequency of the commercial power source.

In one exemplary embodiment, when the input voltage of the commercial power source is within a predetermined voltage range or when the input frequency of the commercial power source is within a predetermined frequency range, the compressor control unit may connect the commercial power source directly to the compressor. When the input voltage of the commercial power source is out of the predetermined voltage range or when the input frequency of the commercial power source is out of the predetermined frequency range, the compressor control unit may operate the compressor through the power conversion unit by generating a control signal.

In one exemplary embodiment, the compressor control device may further include at least one switching unit connecting the commercial power source directly to the compressor or connecting the commercial power source to the compressor through the power conversion unit.

In one exemplary embodiment, the compressor control unit may have a plurality of operation modes. The compressor control unit may drive the switching unit by generating a switching signal depending one of the plurality of operation modes. The compressor control unit may connect a capacitor having capacitance corresponding to inductance of a coil wound to the motor according to one of the plurality of operation modes.

To achieve these and other advantages and in accordance with the purpose of this specification, as embodied and broadly described herein, a refrigerator includes a commercial power source supplying power to the refrigerator and a compressor having a motor; a power conversion unit having an inverter, and converting the power of the commercial power source into driving power of the motor according to an inverter driving signal; a compressor control unit opened/closed according to a first control signal, and driving the inverter by generating the inverter driving signal; at least one switching unit connecting the commercial power source directly to the compressor according to a second control signal or connecting the commercial power source to the compressor through the power conversion unit; and a refrigerator control unit opening/closing the compressor control unit by generating the first control signal, and opening/closing the switching unit by generating the second control signal, based on an input voltage or input frequency of the commercial power source.

In one exemplary embodiment, when the input voltage of the commercial power source is within a predetermined voltage range or when the input frequency of the commercial power source is within a predetermined frequency range, the refrigerator control unit may connect the commercial power source directly to the compressor by generating the second control signal. When the input voltage of the commercial power source is out of the predetermined voltage range or when the input frequency of the commercial power source is out of the predetermined frequency range, the refrigerator control unit may generate the second control signal for operating the compressor through the power conversion unit.

In one exemplary embodiment, the refrigerator control unit may have a plurality of operation modes. The refrigerator control unit may drive the switching unit by generating a switching signal depending one of the plurality of operation modes. The refrigerator control unit may connect a capacitor having capacitance corresponding to inductance of a coil wound to the motor according to one of the plurality of operation modes.

To achieve these and other advantages and in accordance with the purpose of this specification, as embodied and broadly described herein, a compressor control method includes detecting an input voltage of a commercial power source supplying power to a compressor; deciding whether the detected input voltage is within a predetermined voltage range; and operating the compressor by connecting the commercial power source directly to the compressor when the detected input voltage is within the predetermined voltage range.

In one exemplary embodiment, the compressor control method may further include converting the power of the commercial power source into driving power of a motor provided in the compressor when the detected input voltage is out of the predetermined voltage range; and operating the compressor based on the driving power of the motor.

To achieve these and other advantages and in accordance with the purpose of this specification, as embodied and broadly described herein, a compressor control method includes detecting an input frequency of a commercial power source supplying power to a compressor; deciding whether the detected input frequency is within a predetermined frequency range; and operating the compressor by connecting the commercial power source directly to the compressor when the detected input frequency is within the predetermined frequency range.

In one exemplary embodiment, the compressor control method may further include converting the power of the commercial power source into driving power of a motor provided in the compressor when the detected input frequency is out of the predetermined frequency range; and operating the compressor based on the driving power of the motor.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

In the compressor control device and method, and the refrigerator having the same according to the exemplary embodiments, the compressor can be operated by selectively using a mode in which the compressor is operated through the inverter or a mode in which the power of the commercial power source is directly input to the compressor according to the quality of the power of the commercial power source.

Further, the power of the commercial power source is directly input to the compressor when the input voltage or input frequency of the commercial power source is within a predetermined voltage range or predetermined frequency range, thereby reducing or removing loss caused by the use of the inverter.

Further, power consumption is reduced, so that it is possible to improve energy efficiency and to reduce harmonics and power factor distortion, caused by the use of the inverter.

BRIEF DESCRIPTION OF THE DRAWINGS

FIGS. 8 and 9 are flowcharts schematically illustrating compressor control methods according to exemplary embodiments.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Figure 1:
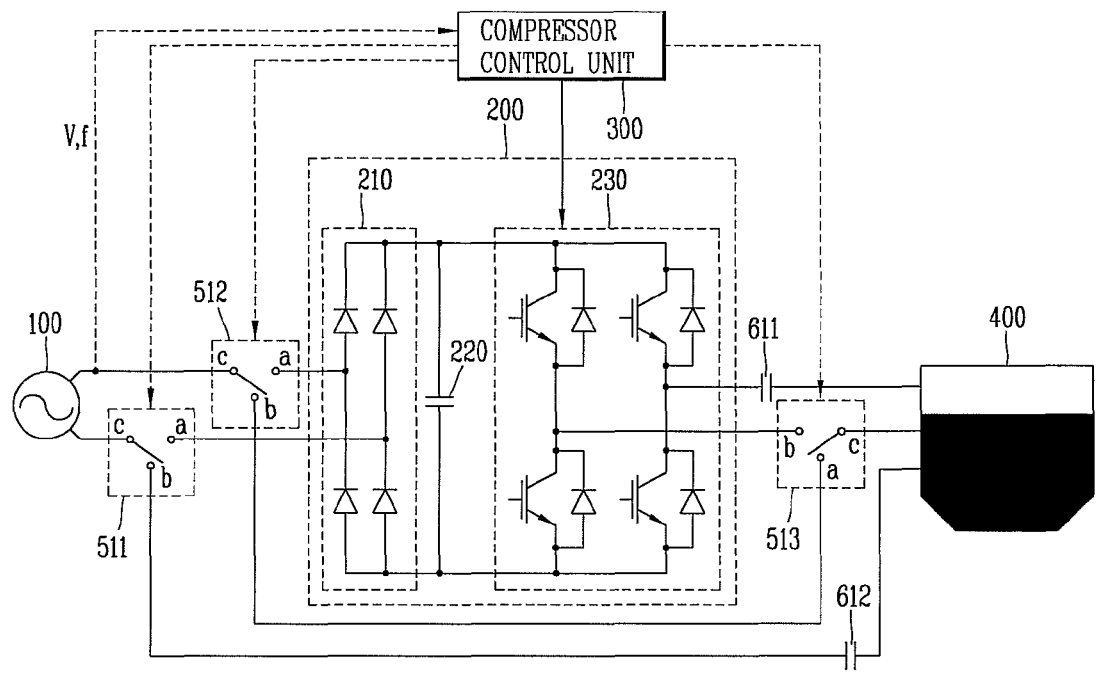
FIGS. 1 and 2 are block diagrams schematically illustrating configurations of compressor control devices according to exemplary embodiments.
Figure 2:
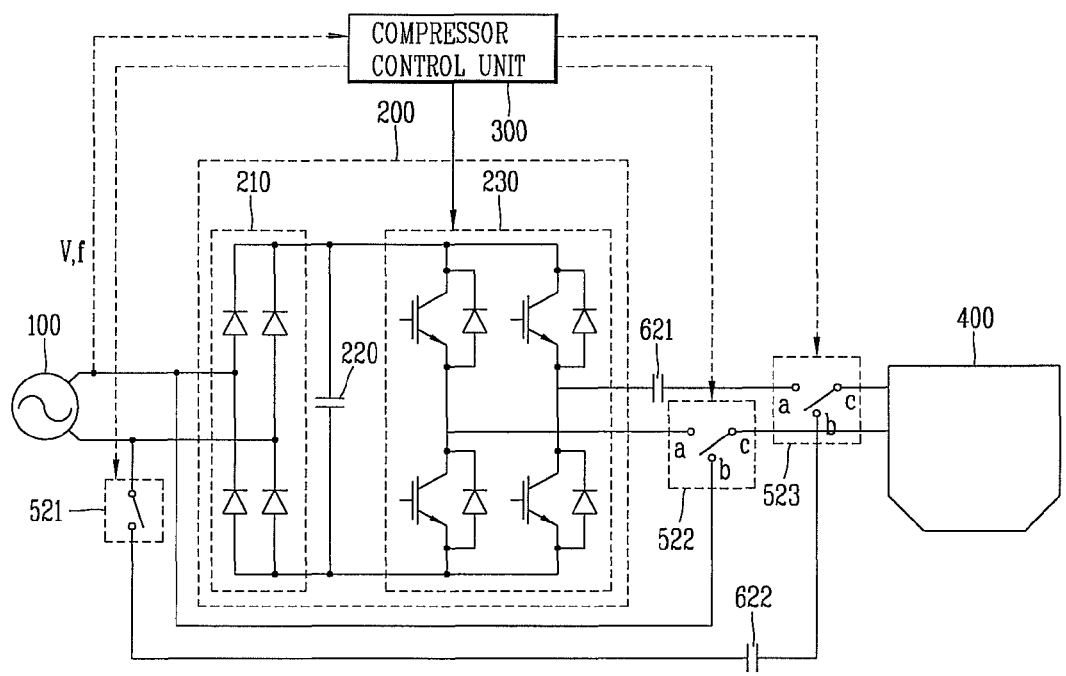

Referring to FIG. 1 or 2, a compressor control device according to an exemplary embodiment includes a compressor 400 having a motor, a commercial power source 100 supplying power to the compressor 400, a power conversion unit 200 converting the power of the commercial power source 100 into driving power of the motor and outputting the converted driving power, and a compressor control unit 300 operating the compressor 400 by connecting the commercial power source 100 directly to the compressor 400, or operating the compressor 400 through the power conversion unit 200, based on an input voltage or input frequency of the commercial power source 100.

If the input voltage of the commercial power source 100 is within a predetermined voltage range, e.g., 210V to 230V, the compressor control unit 300 connects the commercial power source 100 directly to the compressor 400. Alternatively, if the input frequency of the commercial power source 100 is within predetermined frequency range, e.g., 59.7 Hz to 60.3 Hz, the compressor control unit 300 connects the commercial power source 100 directly to the compressor 400.

If the input voltage of the commercial power source 100 is out of the predetermined voltage range, the compressor control unit 300 generates a control signal to operate the compressor 400 through the power conversion unit 200. Alternatively, if the input frequency of the commercial power source 100 is out of the predetermined frequency range, the compressor control unit 300 generates a control signal to operate the compressor 400 through the power conversion unit 200.

The power conversion unit 200 includes a converter 210 converting an AC voltage of the commercial power source 100 into a DC voltage, a smoothing capacitor 220 connected in parallel to the converter 210, and smoothing the DC voltage and outputting the smoothed DC voltage, and an inverter 230 converting the smoothed DC voltage into a driving voltage of the motor according to the control signal and outputting the converted driving voltage.

The converter 210 as an AC-DC converter is configured with a combination of diodes as rectifiers. The converter 210 converts the input power, i.e., the AC voltage of the commercial power source 100 into a DC voltage. Here, the DC voltage is substantially a DC voltage of pulsating current.

The smoothing capacitor 220 as a DC link capacitor smoothes the DC voltage of pulsating current, output from the converter 210 and outputs the smoothed DC voltage to a terminal of the inverter 230. When the power input to the commercial power source is AC 220V, the voltage applied through the smoothing capacitor 220 is about DC 310V.

The inverter 230 converts the DC voltage output from the smoothing capacitor 220 into a driving voltage of the motor according to the control signal and outputs the converted driving voltage to the motor provided in the compressor 400. The inverter 230 has a plurality of switching elements, e.g., transistors.

Here, the motor may be a linear motor or brushless direct current (BLDC) motor. The linear motor directly generates a linear driving force in itself, and hence does not require a mechanical conversion device. Further, the linear motor doe not have a complicated structure, and can reduce loss caused by energy conversion. Since the linear motor has no connection portion at which friction and abrasion occur, noise can be remarkably reduced. In a case where a reciprocating compressor having the linear motor is used in a refrigerator, the compression ratio the compressor can be changed as the stroke voltage applied to the linear motor is changed, and thus the compressor can be used in variable control of cooling capacity.

Meanwhile, the BLDC motor is a motor obtained by removing a brush and a commutator from a DC motor and mounting an electronic rectifier mechanism to the DC motor, and has a small mechanical and electrical noise. The BLDC motor has a rotating magnet at the center thereof, and a driving coil is provided around the magnet. Since the BLDC motor has no commutator, an electronic rectifier circuit is further provided to the BLDC motor. The electronic rectifier circuit senses the position of a magnet rotor, using a magnetic pole sensor such as a Hall element.

The compressor control device according to the exemplary embodiment further include at least one switching unit 500 connecting the commercial power source 100 directly to the compressor 400 or connecting the commercial power source 100 to the compressor 400 through the power conversion unit 200.

The compressor control unit 300 may have a plurality of operation modes. The compressor control unit 300 drives the switching unit 500 by generating a switching signal depending on the operation mode. The compressor control unit 300 connects a capacitor 600 having capacitance corresponding to inductance of a coil wound to the motor, depending on the operation mode.

Referring to FIG. 1, a compressor control device according to an exemplary embodiment includes first and second switching units 511 and 512 respectively connected to two power lines between the commercial power source 100 and the power conversion unit 200, and further includes a third switching unit 513 connected to an output terminal of the inverter 230 of the power conversion unit 200. In an initial stage, the compressor control unit 300 actuates the compressor 400 by generating a switching signal for turning off all the first to third switching units 511 to 513. That is, the compressor control unit 300 actuates the compressor 400 by connecting points b to c in the first switching unit 511, connecting points b to c in the second switching unit 512, and connecting points b to c in the third switching unit 513.

Then, the compressor control unit 300 detects an input voltage or input frequency of the commercial power source 100. When the input voltage of the commercial power source 100 is within the predetermined voltage range, e.g., 210V to 230V or when the input frequency of the commercial power source 100 is within the predetermined frequency range, e.g., 59.7 Hz to 60.3 Hz, the compressor control unit 300 connects the commercial power source 100 directly to the compressor 400. In this case, the compressor 400 is operated in a power saving (operation) mode. That is, the compressor control unit 300 turns on the third switching unit 513 in a state in which the first and second switching units 511 and 512 are turned off. The compressor control unit 300 connects the commercial power source 100 directly to the compressor 400 by connecting points a to c in the third switching unit 513. In this case, a capacitor 612 is connected to the compressor 400, and the capacitance of the capacitor 612 is smaller than that of a capacitor 611.

When the input voltage of the commercial power source 100 is out of the predetermined voltage range or when the input frequency of the commercial power source 100 is out of the predetermined frequency range, the compressor control unit 300 generates the control signal and operates the compressor 400 through the power conversion unit 200 according to the control signal. That is, the compressor control unit 300 turns on the first and second switching units 511 and 512, and turns off the third switching unit 513. The compressor control unit 300 operates the compressor 400 by connecting points a to c in each of the first and second switching units 511 and 512, connecting points b to c in the third switching unit 513, and then generating the control signal for driving the inverter 230. Here, the compressor 400 is operated in a safe (operation) mode. In this case, the capacitor 611 is connected to the compressor 400, and the capacitance of the capacitor 611 is greater than that of the capacitor 612.

Referring to FIG. 2, a compressor control device according to an exemplary embodiment includes a first switching unit 521 connecting or disconnecting between the commercial power source 100 and the compressor 400 on a line for directly connecting between the commercial power source 100 and the compressor 400, and a plurality of switching units, i.e., second and third switching units 522 and 523 respectively connected to output terminals of the inverter 230 of the power conversion unit 200.

The compressor control unit 300 actuates the compressor 400 by generating a switching signal for turning off all the first to third switching units 521 to 523 in an initial operation mode. That is, the compressor control unit 300 actuates the compressor 400 by opening the first switching unit 521, connecting points b to c in the second switching unit 522, and connecting points b to c in the third switching unit 523.

When the input voltage of the commercial power source 100 is within the predetermined voltage range, e.g., 210V to 230V or when the input frequency of the commercial power source 100 is within the predetermined frequency range, e.g., 59.7 Hz to 60.3 Hz, the compressor control unit 300 connects the commercial power source 100 directly to the compressor 400. In this case, the compressor 400 is operated in the power saving (operation) mode. That is, the compressor control unit 300 connects the commercial power source 100 directly to the compressor 400 by turning on the first switching unit 521 in a state in which the compressor control unit 300 connects points b to c in each of the second and third switching units 522 and 523. In this case, a capacitor 622 is connected to the compressor 400, and the capacitance of the capacitor 622 is smaller than that of a capacitor 621.

When the input voltage of the commercial power source 100 is out of the predetermined voltage range or when the input frequency of the commercial power source 100 is out of the predetermined frequency range, the compressor control unit 300 operates the compressor 400 through the power conversion unit 200 by generating the control signal. That is, the compressor control unit 300 operates the compressor 400 by connecting points a to c in each of the second and third switching units 522 and 523 in a state in which the first switching unit 521 is opened, and then generating the control signal for driving the inverter 230. Here, the compressor 400 is operated in the safe (operation) mode. In this case, the capacitor 621 is connected to the compressor 400, and the capacitance of the capacitor 621 is greater than that of the capacitor 622.

Figure 5:
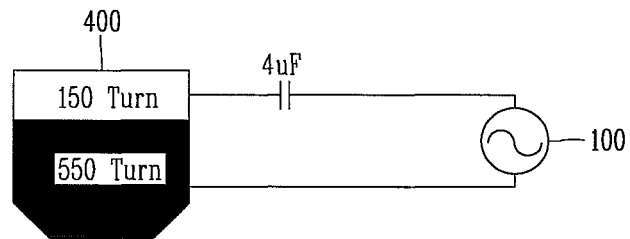
FIG. 5 is a view illustrating a state in which a compressor operates in a power saving mode according to an exemplary embodiment of the present invention.
Figure 6:
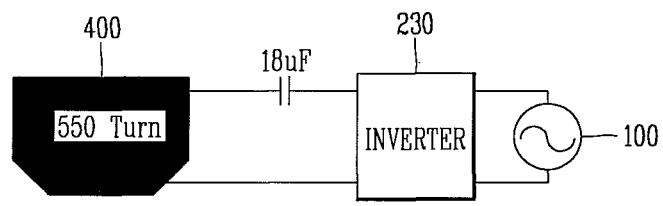
FIG. 6 is a view illustrating a state in which a compressor operates in a safe mode according to an exemplary embodiment of the present invention.
Figure 7:
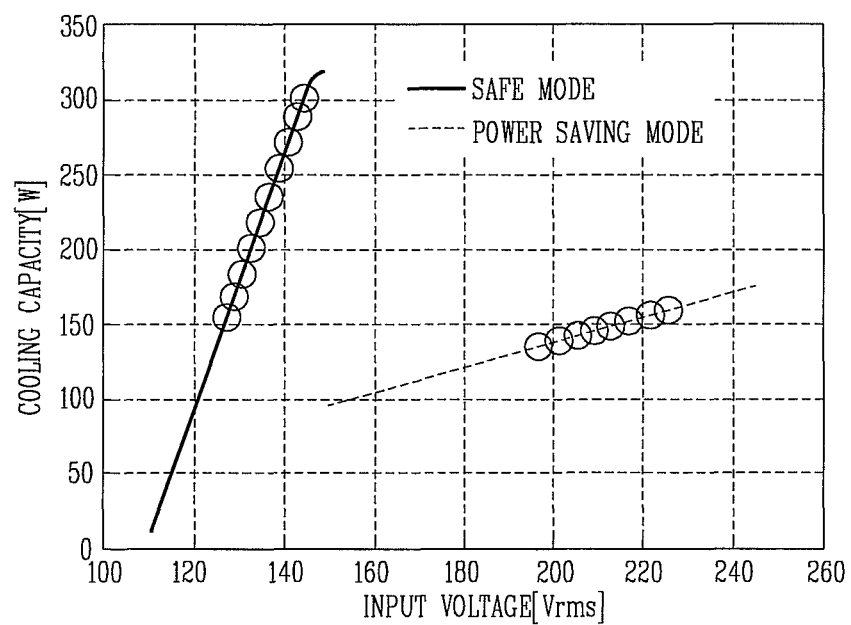
FIG. 7 is a graph comparing performance of the compressor in the power saving mode and performance of the compressor in the safe mode.

FIG. 5 is a schematic circuit diagram illustrating a configuration when the compressor 400 is operated in the power saving (operation) mode. FIG. 6 is a schematic circuit diagram illustrating a configuration when the compressor 400 is operated in the safe (operation) mode. As shown in FIG. 5, when the number of turns of a motor coil in the compressor 400 is 550+150(=700 T) in the power saving mode, the capacitance of an operation capacitor becomes 4 µF when the compressor 400 is intended to operate in a state in which the LC resonant frequency of the motor coil and the operation capacitor is no more than 90 Hz. As shown in FIG. 6, when the number of turns of the motor coil in the compressor 400 is 550 T, the capacitance of the operation capacitor becomes 18 µF. It can be seen that the capacitance of the operation capacitor in the safe mode is greater than that of the operation capacitor in the power saving mode. FIG. 7 is a graph illustrating relationships between input voltages and cooling capacities in the power saving mode and the safe mode. Since the cooling capacity can be increased according to the input voltage in the safe mode, the operation of the compressor can be performed according to a refrigerator load or a command requested by the refrigerator. FIGS. 5 to 7 illustrates one experimental result, in which it is described that the compressor can be driven by connecting the commercial power source directly to the compressor while ensuring system stability.

Figure 3:
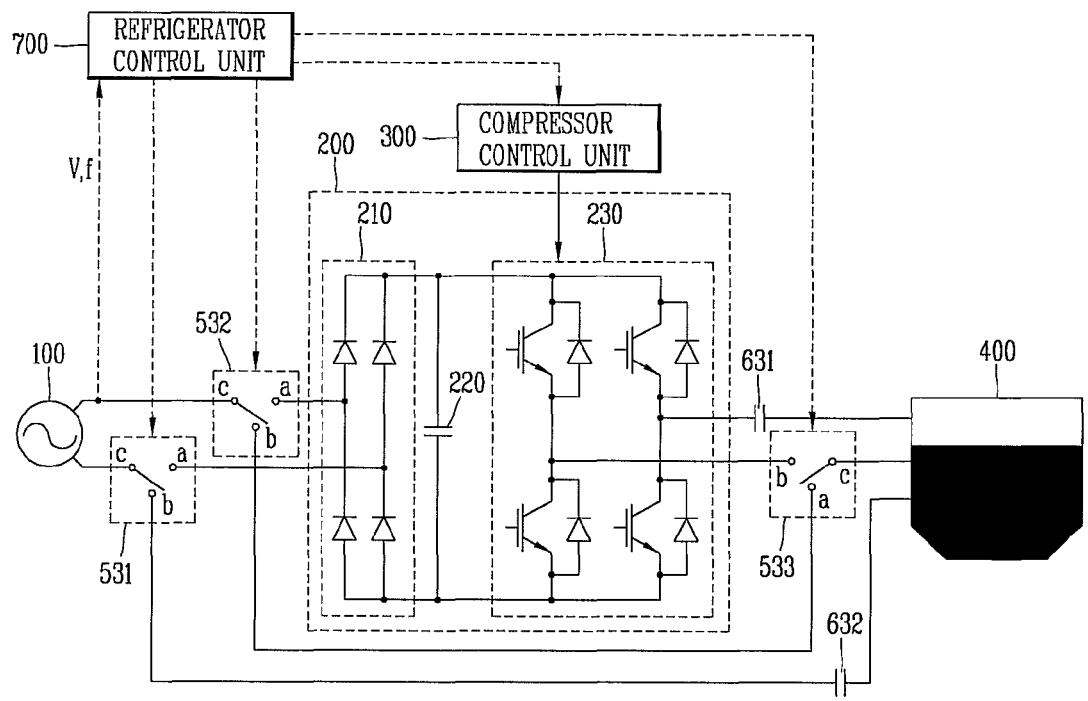
FIGS. 3 and 4 are block diagrams schematically illustrating configurations of refrigerators according to exemplary embodiments.
Figure 4:
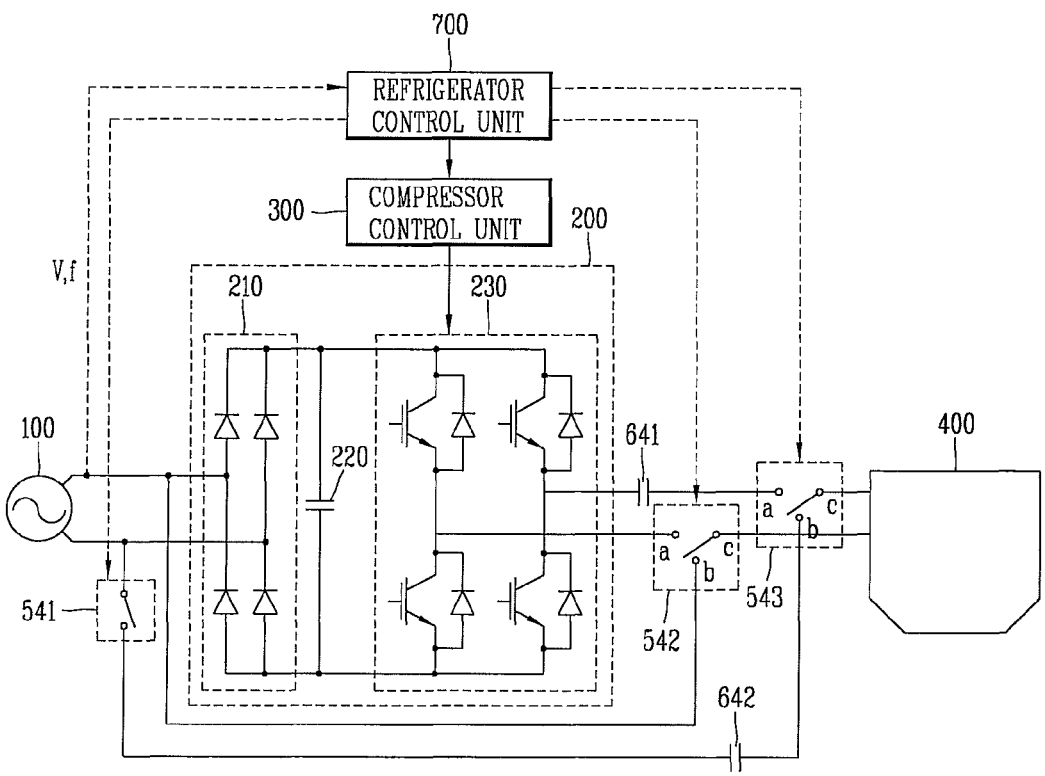

Referring to FIG. 3 or 4, a refrigerator according to an exemplary embodiment includes a commercial power source 100 supplying power to the refrigerator and a compressor 400, a power conversion unit 200 having an inverter 230, and converting the power of the commercial power source 100 into driving power of a motor under an inverter driving signal and outputting the converted driving power, a compressor control unit 300 opened/closed according to a first control signal, and driving the inverter 230 by generating the inverter driving signal, at least one switching unit 500 connecting the commercial power source 100 directly to the compressor 400 according to a second control signal or connecting the commercial power source 100 to the compressor 400 through the power conversion unit 200, and a refrigerator control unit 700 opening/closing the compressor control unit 300 by generating the first control signal, and opening/closing the switching unit 500 by generating the second control signal, based on the input voltage or input frequency of the commercial power source 100.

The power conversion unit 200 includes a converter 210 converting an AC voltage of the commercial power source 100 into a DC voltage, a smoothing capacitor 220 connected in parallel to the converter 210, and smoothing the DC voltage and outputting the smoothed DC voltage, and an inverter 230 converting the smoothed DC voltage into a driving voltage of the motor according to the control signal and outputting the converted driving voltage.

The converter 210 as an AC-DC converter is configured with a combination of diodes as rectifiers. The converter 210 converts the input power, i.e., the AC voltage of the commercial power source 100 into a DC voltage. Here, the DC voltage is substantially a DC voltage of pulsating current.

The smoothing capacitor 220 as a DC link capacitor smoothes the DC voltage of pulsating current, output from the converter 210 and outputs the smoothed DC voltage to a terminal of the inverter 230. When the power input to the commercial power source is AC 220V, the voltage applied through the smoothing capacitor 200 is about DC 310V.

The inverter 230 converts the DC voltage output from the smoothing capacitor 220 into a driving voltage of the motor according to the control signal and outputs the converted driving voltage to the motor provided in the compressor 400. The inverter 230 has a plurality of switching elements, e.g., transistors.

Here, the motor may be a linear motor or BLDC motor.

When the input voltage of the commercial power source 100 is within a predetermined voltage range, e.g., 210V to 230V or when the input frequency of the commercial power source 100 is within predetermined frequency range, e.g., 59.7 Hz to 60.3 Hz, the refrigerator control unit 700 connects the commercial power source 100 directly to the compressor 400 by generating the second control signal.

The refrigerator control unit 700 may have a plurality of operation modes. The refrigerator control unit 700 opens/closes the compressor control unit 300 by generating the first control signal, and drives the switching unit 500 by generating the second control signal depending on the operation mode.

The refrigerator control unit 700 connects a capacitor 600 having capacitance corresponding to inductance of a coil wound to the motor, depending on the operation mode.

Referring to FIG. 3, a refrigerator according to an exemplary embodiment includes first and second switching units 531 and 532 respectively connected to two power lines between the commercial power source 100 and the power conversion unit 200, and further includes a third switching unit 533 connected to an output terminal of the inverter 230 of the power conversion unit 200. In an initial stage, the refrigerator control unit 700 actuates the compressor control unit 300 by outputting a first control signal, and generates a second control signal for turning off all the first to third switching units 531 to 533. That is, the refrigerator control unit 700 actuates the compressor control unit 300 by connecting points b to c in the first switching unit 531, connecting points b to c in the second switching unit 532, and connecting points b to c in the third switching unit 533.

Then, the refrigerator control unit 700 receives an input voltage or input frequency detected from a voltage detection unit (not shown) or frequency detection unit (not shown). When the input voltage of the commercial power source 100 is within a predetermined voltage range, e.g., 210V to 230V or when the input frequency of the commercial power source 100 is within predetermined frequency range, e.g., 59.7 Hz to 60.3 Hz, the refrigerator control unit 700 connects the commercial power source 100 directly to the compressor 400. In this case, the compressor 400 is operated in a power saving (operation) mode. That is, the refrigerator control unit 700 turns on the third switching unit 533 in a state in which the first and second switching units 531 and 532 are turned off. The refrigerator control unit 700 connects the commercial power source 100 directly to the compressor 400 by connecting points a to c in the third switching unit 533. In this case, a capacitor 632 is connected to the compressor 400, and the capacitance of the capacitor 632 is smaller than that of a capacitor 631.

When the input voltage of the commercial power source 100 is out of the predetermined voltage range or when the input frequency of the commercial power source 100 is out of the predetermined frequency range, the refrigerator control unit 700 generates the second control signal for operating the compressor 400 through the power conversion unit 200. That is, the refrigerator control unit 700 turns on the first and second switching units 531 and 532, and turns off the third switching unit 533. The refrigerator control unit 700 connects points a to c in each of the first and second switching units 531 and 532, and connects points b to c in the third switching unit 533. The refrigerator control unit 700 generates the first control signal, and controls the compressor 400 to perform operations of on/off, cooling capacity variation, speed control, frequency control, stroke control, etc. according to a command requested by the refrigerator and to maintain the temperature in the refrigerator to an appropriate level by applying power to the compressor control unit 300. Here, the compressor 400 is operated in a safe (operation) mode. In this case, the capacitor 631 is connected to the compressor 400, and the capacitance of the capacitor 631 is greater than that of the capacitor 632.

Referring to FIG. 4, a refrigerator according to an exemplary embodiment includes a first switching unit 541 connecting or disconnecting between the commercial power source 100 and the compressor 400 on a line for directly connecting between the commercial power source 100 and the compressor 400, and a plurality of switching units, i.e., second and third switching units 542 and 543 respectively connected to output terminals of the inverter 230 of the power conversion unit 200.

The refrigerator control unit 700 actuates the compressor 400 by generating the second control signal for turning off all the first to third switching units 541 to 543 in an initial operation mode. That is, the refrigerator control unit 700 actuates the compressor 400 by opening the first switching unit 541, connecting points b to c in the second switching unit 542, and connecting points b to c in the third switching unit 543.

When the input voltage of the commercial power source 100 is within the predetermined voltage range, e.g., 210V to 230V or when the input frequency of the commercial power source 100 is within the predetermined frequency range, e.g., 59.7 Hz to 60.3 Hz, the refrigerator control unit 700 connects the commercial power source 100 directly to the compressor 400. In this case, the compressor 400 is operated in the power saving (operation) mode. That is, the refrigerator control unit 700 connects the commercial power source 100 directly to the compressor 400 by turning on the first switching unit 541 in a state in which the refrigerator control unit 700 connects points b to c in each of the second and third switching units 542 and 543. In this case, a capacitor 642 is connected to the compressor 400, and the capacitance of the capacitor 642 is smaller than that of a capacitor 641.

When the input voltage of the commercial power source 100 is out of the predetermined voltage range or when the input frequency of the commercial power source 100 is out of the predetermined frequency range, the refrigerator control unit 700 generates the second control signal for operating the compressor 400 through the power conversion unit 200. That is, the refrigerator control unit 700 connects points a to c in each of the second and third switching units 542 and 543 in a state in which the first switching unit 541 is opened. The refrigerator control unit 700 controls the compressor 400 to perform operations of on/off, cooling capacity variation, speed control, frequency control, stroke control, etc. according to a command requested by the refrigerator and to maintain the temperature in the refrigerator to an appropriate level by applying power to the compressor control unit 300. Here, the compressor 400 is operated in the safe (operation) mode. In this case, the capacitor 641 is connected to the compressor 400, and the capacitance of the capacitor 641 is greater than that of the capacitor 642.

When the input voltage of the commercial power source 100 is within the predetermined voltage range or when the input frequency of the commercial power source 100 is within the predetermined frequency range, the refrigerator control unit 700 can cut off the power of the compressor control unit 300. That is, the refrigerator control unit 700 does not control the compressor control unit 300 to be in a standby state by continuously applying power to the compressor control unit 300 but cuts off the power of the compressor control unit 300, thereby reducing standby power.

Figure 8:
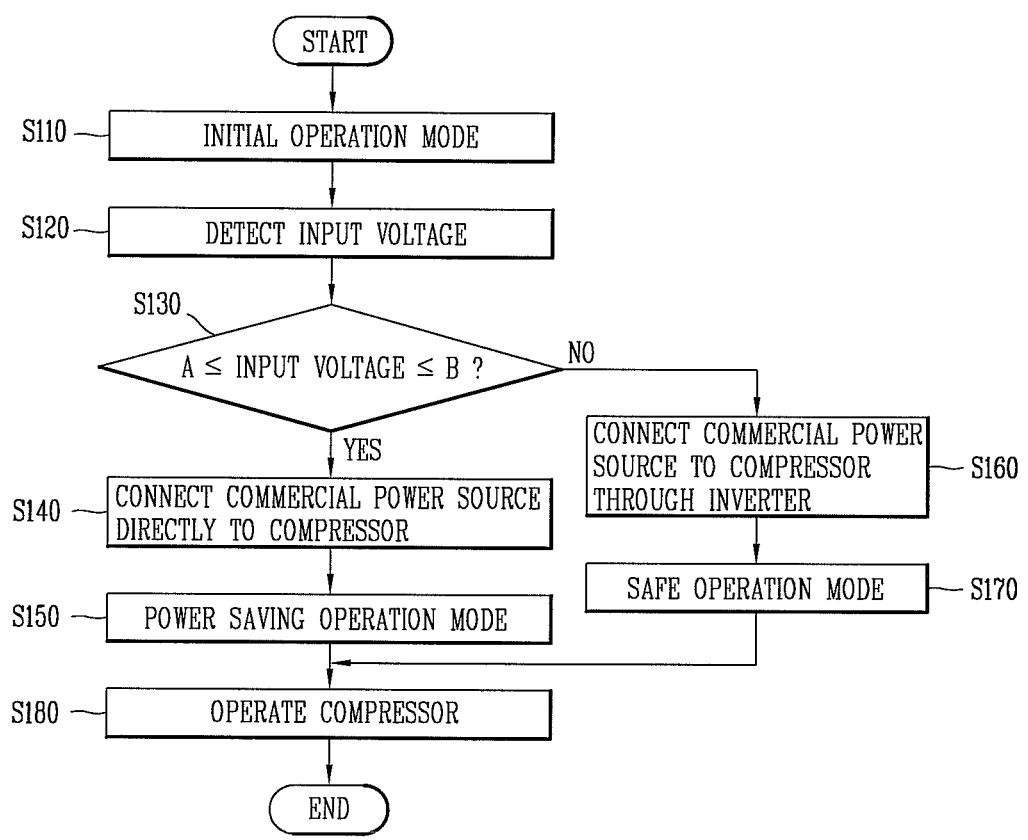

Referring to FIG. 8, a compressor control method according to an exemplary embodiment includes detecting an input voltage of a commercial power source supplying power to a compressor (S120), deciding whether the detected input voltage is within a predetermined voltage range (S130), and connecting the commercial power source directly to a compressor when the detected input voltage is within the predetermined voltage range and operating the compressor, (S140 and S150).

The compressor control method according to the exemplary embodiment further includes converting the power of the commercial power source into driving power of a motor provided in the compressor when the detected input voltage is out of the predetermined voltage range (S160), and operating the compressor based on the driving power of the motor (S170). Hereinafter, the configuration of a compressor control device will be described with reference to FIGS. 1 to 7.

The compressor control unit 300 in FIGS. 1 and 2 or the refrigerator control unit 700 in FIGS. 3 and 4 generates a switching signal and operates the compressor 400 by opening the switching unit in an initial operation mode (S110). When the input voltage of the commercial power source 100 is within the predetermined voltage range, e.g., 210V to 230V ('Yes' in S130), the compressor control unit 300 or the refrigerator control unit 700 connects the commercial power source 100 directly to the compressor 400, and operates the compressor 400 (S140 and S150). On the other hand, when the input voltage of the commercial power source 100 is out of the predetermined voltage range ('No' in S130), the compressor control unit 300 or the refrigerator control unit 700 connects the commercial power source 100 to the compressor 400 through the inverter 230. The compressor control unit 300 drives the inverter 230 to perform a speed, frequency or stroke control of the compressor 400 (S170).

Referring to FIG. 9, a compressor control method according to an exemplary embodiment includes detecting an input frequency of a commercial power source supplying power to a compressor (S220), deciding whether the detected input frequency is within a predetermined frequency range (S230), and connecting the commercial power source directly to the compressor and operating the compressor (S240 and S250).

The compressor control method according to the exemplary embodiment further includes converting the power of the commercial power source into a driving power of a motor provided in the compressor when the detected input frequency is out of the predetermined frequency range (S260), and operating the compressor based on the driving power of the motor (S270). Hereinafter, the configuration of a compressor control device will be described with reference to FIGS. 1 to 7.

The compressor control unit 300 in FIGS. 1 and 2 or the refrigerator control unit 700 in FIGS. 3 and 4 actuates the compressor 400 in an initial operation mode (S210). When the input frequency of the commercial power source 100 is within the predetermined frequency range, e.g., 59.7 Hz to 60.3 Hz ('Yes' in S230), the compressor control unit 300 or the refrigerator control unit 700 connects the commercial power source 100 directly to the compressor 400 and operates the compressor (S240 and S250). On the other hand, when the input frequency of the commercial power source 100 is out of the predetermined frequency range ('No' in S230), the compressor control unit 300 or the refrigerator control unit 700 connects the commercial power source 100 to the compressor 400 through the inverter 230 (S260). The compressor control unit 300 drives the inverter 230 to perform a speed, frequency or stroke control of the compressor 400 (S270).

Referring to FIGS. 8 and 9, in the compressor control method, the operating of the compressor 400 in the power saving (operation) mode (S150 or S250) and the operating of the compressor 400 in the safe (operation) mode (S170 or S270) includes changing capacitance depending on the operation mode of the compressor 400. Referring to FIGS. 5 to 7, in a case where the compressor 400 is operated in the power saving (operation) mode, the number of turns of the motor coil increases (700 T), and the capacitance of the capacitor connected to the motor has a relatively small value so that the compressor 400 is operated corresponding to the inductance of the motor coil (4 µF). On the other hand, in a case where the compressor 400 is operated in the safe (operation) mode, the number of turns of the motor coil decreases (550 T), and the capacitance of the capacitor has a large value (18 µF).

In the compressor control device and method, and the refrigerator having the same according to the exemplary embodiments, the compressor can be operated by selectively using a mode in which the compressor is operated through the inverter or a mode in which the power of the commercial power source is directly input to the compressor according to the quality of the power of the commercial power source. Further, the power of the commercial power source is directly input to the compressor when the input voltage or input frequency of the commercial power source is within a predetermined voltage range or predetermined frequency range, thereby reducing or removing loss caused by the use of the inverter. Further, power consumption is reduced, so that it is possible to improve energy efficiency.

The invention claimed is:

1. A compressor control device, comprising:
   a commercial power source that supplies power to a compressor having a motor,
   a power converter that converts the power of the commercial power source into a driving power of the motor and outputs the converted driving power;
   a compressor controller, connected directly to the commercial power source, that receives, from the commercial power source, an input voltage or an input frequency that is not rectified and that operates the compressor by connecting the commercial power source directly to the compressor or through the power converter, based on an input voltage or an input frequency of a non-rectified commercial power source; and
   at least one switch that connects the commercial power source directly to the compressor or connects the commercial power source to the compressor through the power converter, wherein the compressor controller includes a plurality of operation modes, and wherein the compressor controller drives the at least one switch by generating a switching signal based on one of the plurality of operation modes that is based on the input voltage or the input frequency of the commercial power source,
   wherein the compressor controller that operates the compressor by connecting the commercial power source directly to the compressor or by connecting the commercial power source to the compressor through the power converter in a second operation mode after the compressor controller detects whether the input voltage or the input frequency of the commercial power source is within a predetermined range after the compressor is actuated in an initial operation mode, and wherein the compressor controller operates the compressor by connecting the commercial power source directly to the compressor when the input voltage or the input frequency of the non-rectified commercial power source is within the predetermined range, or actuates the compressor through the power converter when the input voltage or the input frequency of the non-rectified commercial power source is out of the predetermined range, in the second operation mode.

2. The compressor control device of claim 1, wherein the power converter comprises:
- a converter that converts an AC voltage of the commercial power source into a DC voltage;
- a smoothing capacitor that is connected in parallel to the converter, and that smooths the DC voltage and outputs the smoothed DC voltage; and
- an inverter that converts the smoothed DC voltage into a driving voltage of the motor based on the control signal and outputs the converted driving voltage.

3. The compressor control device of claim 1, wherein the compressor controller connects a capacitor having a capacitance corresponding to an inductance of a coil wound to the motor according to one of the plurality of operation modes.

4. The compressor control device of claim 1, wherein the plurality of operation modes includes a power saving mode and a safe mode, and wherein the compressor controller operates the compressor in the power saving mode when the input voltage of the commercial power source is within a predetermined voltage range or when the input frequency of the commercial power source is within a predetermined frequency range.

5. The compressor control device of claim 4, wherein the compressor controller operates the compressor in the safe mode when the input voltage of the commercial power source is out of the predetermined voltage range or when the input frequency of the commercial power source is out of the predetermined frequency range.

6. A refrigerator, comprising:
- a commercial power source that supplies power to the refrigerator and a compressor having a motor;
- a power converter that includes an inverter, and that converts the power of the commercial power source into a driving power of the motor according to an inverter driving signal;
- a compressor controller that is opened or closed based on a first control signal, and that drives the inverter by generating the inverter driving signal;
- at least one switch that connects the commercial power source directly to the compressor based on a second control signal or connects the commercial power source to the compressor through the power converter; and
- a refrigerator controller connected directly to the commercial power source that receives an input voltage or an input frequency that is not rectified from the commercial power source and that opens or closes the compressor controller by generating the first control signal, and that opens or closes the at least one switch by generating the second control signal, based on an input voltage or input frequency of a non-rectified commercial power source, wherein the compressor controller includes a plurality of operation modes, and wherein the compressor controller drives the at least one switch by generating a switching signal based on one of the plurality of operation modes that is based on the input voltage or the input frequency of the commercial power source, wherein the compressor controller that operates the compressor by connecting the commercial power source directly to the compressor or through the power converter in a second operation mode after the compressor controller detects whether the input voltage or the input frequency of the commercial power source is within a predetermined range after the compressor is actuated in an initial operation mode, and wherein the compressor controller operates the compressor by connecting the commercial power source directly to the compressor when the input voltage or the input frequency of the non-rectified commercial power source is within the predetermined range, or actuates the compressor through the power converter when the input voltage or the input frequency of the non-rectified commercial power source is out of the predetermined range, in the second operation mode.

7. The refrigerator of claim 6, wherein the power converter comprises:
- a converter that converts an AC voltage of the commercial power source into a DC voltage;
- a smoothing capacitor that is connected in parallel to the converter, and that smooths the DC voltage and outputs the smoothed DC voltage; and
- an inverter that converts the smoothed DC voltage into a driving voltage of the motor according to the inverter driving signal and outputs the converted driving voltage.

8. The refrigerator of claim 6, wherein the refrigerator controller connects a capacitor having a capacitance corresponding to an inductance of a coil wound to the motor based on one of the plurality of operation modes.

9. The refrigerator of claim 6, wherein the plurality of operation modes includes a power saving mode and a safe mode, and wherein the refrigerator controller operates the compressor in the power saving mode when the input voltage of the commercial power source is within a predetermined voltage range or when the input frequency of the commercial power source is within a predetermined frequency range, and operates the compressor in the safe mode when the input voltage of the commercial power source is out of the predetermined voltage range or when the input frequency of the commercial power source is out of the predetermined frequency range.

10. The compressor control device of claim 2, wherein the at least one switch includes a first switch, a second switch, and a third switch.

11. The compressor control device of claim 10, wherein the first and second switches are respectively connected to two power lines of the commercial power source and the power converter, and wherein the third switch is connected to an output of the inverter.

12. The compressor control device of claim 11, wherein when the input voltage of the commercial power source is within the predetermined voltage range or when the input frequency of the commercial power source is within the predetermined frequency range, the first and second switches connect the commercial power source directly to the compressor.

13. The compressor control device of claim 12, wherein when the input voltage of the commercial power source is out of the predetermined voltage range or when the input frequency of the commercial power source is out of the predetermined frequency range, the third switch connects the inverter to the compressor.

14. The compressor control device of claim 13, wherein the predetermined voltage range is within a range of 210 volt to 230 volt, and wherein the predetermined frequency range is within a range of 59.7 Hz to 60.3 Hz.

15. The compressor control device of claim 6, wherein the predetermined voltage range is within a range of 210 volt to 230 volt, and wherein the predetermined frequency range is within a range of 59.7 Hz to 60.3 Hz.

* * * * *